(12) United States Patent
Hörold et al.

(10) Patent No.: US 11,859,084 B2
(45) Date of Patent: Jan. 2, 2024

(54) FLAME-RETARDANT AND COLOR-STABLE POLYAMIDE MOLDING COMPOUNDS

(71) Applicant: CLARIANT INTERNATIONAL LTD, Muttenz (CH)

(72) Inventors: Sebastian Hörold, Diedorf (DE); Elke Schlosser, Augsburg (DE); Eva-Maria Leuschner, Augsburg (DE)

(73) Assignee: CLARIANT INTERNATIONAL LTD, Muttenz (CH)

(*) Notice: Subject to any disclaimer, the term of this patent is extended or adjusted under 35 U.S.C. 154(b) by 108 days.

(21) Appl. No.: 16/756,210

(22) PCT Filed: Oct. 9, 2018

(86) PCT No.: PCT/EP2018/077483
§ 371 (c)(1),
(2) Date: Apr. 15, 2020

(87) PCT Pub. No.: WO2019/076688
PCT Pub. Date: Apr. 25, 2019

(65) Prior Publication Data
US 2020/0277491 A1    Sep. 3, 2020

(30) Foreign Application Priority Data
Oct. 16, 2017 (DE) .................. 10 2017 218 453.1

(51) Int. Cl.
C08L 77/06 (2006.01)

(52) U.S. Cl.
CPC ........... *C08L 77/06* (2013.01); *C08L 2201/02* (2013.01); *C08L 2205/03* (2013.01); *C08L 2207/04* (2013.01)

(58) Field of Classification Search
CPC .. C08L 77/06; C08L 2201/02; C08L 2205/03; C08L 2207/04
USPC ........................................................ 524/100
See application file for complete search history.

(56) References Cited

U.S. PATENT DOCUMENTS

| | | |
|---|---|---|
| 3,900,444 A | 8/1975 | Racky et al. |
| 4,036,811 A | 7/1977 | Noetzel et al. |
| 5,034,450 A * | 7/1991 | Betz ............ C08L 77/00 525/425 |
| 5,071,894 A * | 12/1991 | Weil ............ C08K 3/22 524/415 |
| 5,780,534 A | 7/1998 | Kleiner et al. |
| 6,136,973 A | 10/2000 | Suzuki et al. |
| 6,207,736 B1 | 3/2001 | Nass et al. |
| 6,255,371 B1 * | 7/2001 | Schlosser ......... C09K 21/14 524/133 |
| 6,365,071 B1 | 4/2002 | Jenewein et al. |
| 6,509,401 B1 | 1/2003 | Jenewein et al. |
| 9,765,217 B2 | 9/2017 | Lim |
| 10,370,537 B2 | 8/2019 | Pfaendner et al. |
| 2001/0007888 A1 | 7/2001 | Asano |
| 2004/0022607 A1 | 2/2004 | Lim et al. |
| 2004/0225040 A1 | 11/2004 | Hoerold |
| 2006/0058432 A1 | 3/2006 | Perego et al. |
| 2006/0074157 A1 * | 4/2006 | Bauer ............ C08K 5/5313 524/115 |

(Continued)

FOREIGN PATENT DOCUMENTS

| | | |
|---|---|---|
| CN | 105264001 B | 1/2016 |
| DE | 2252258 A1 | 5/1974 |

(Continued)

OTHER PUBLICATIONS

German Office Action dated Apr. 1, 2022 in corresponding German Patent Application No. 102017218453.1.

(Continued)

*Primary Examiner* — Doris L Lee
(74) *Attorney, Agent, or Firm* — Natali Richter

(57) ABSTRACT

The invention relates to a flame-retardant polyamide composition containing: as component A) 1 to 96 wt. % of one or more thermoplastic polyamides; as component B) 2 to 25 wt. % of a diorganylphosphinic acid salt of formula (I),

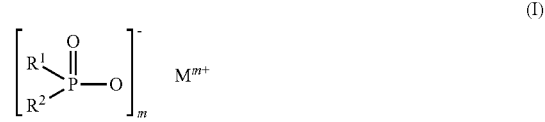

(I)

wherein $R^1$ and $R^2$ are the same or different and $C_1$-$C_{18}$ alkyl is linear, branched or cyclical, $C_6$-$C_{18}$ aryl, $C_7$-$C_{18}$ arylalkyl and/or $C_7$-$C_{18}$ alkylaryl; M is Mg, Ca, Al, Sb, Sn, Ge, Ti, Zn, Fe, Zr, Ce, Bi, Sr, Mn, Li, Na, K and/or a protonated nitrogen base; m is 1 to 4; n is 1 to 4; as component C) 2 to 20 wt. % of at least a further polymer component, selected from the classes of thermoplastic polyester and polyester elastomers; as component D) 0 to 20 wt. % of a salt of the phosphorous acid of general formula (II),

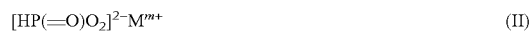

$[HP(=O)O_2]^{2-}M^{m+}$ (II)

in which M is Mg, Ca, Al, Sb, Sn, Ge, Ti, Zn, Fe, Zr, Ce, Bi, Sr, Mn, Li, Na and/or K; as component E) 0 to 20 wt. % of one or more condensation products of melamine and/or reaction products of melamine with phosphoric acids and/or melamine cyanurate; as component F) 0 to 50 wt. % of a filler and/or reinforcing agent; as component G) 0 to 5 wt. % of a compatibilizing agent for the polymer components; as component H) 0 to 2 wt. % of a phosphite or phosphonite or mixtures thereof; and as component I) 0 to 2 wt. % of an ester or salt of long-chained aliphatic carboxylic acids (fatty acids) which typically have chain lengths of $C_{14}$ to $C_{40}$, wherein the sum of the components always amounts to 100 wt. %.

26 Claims, No Drawings

(56) References Cited

U.S. PATENT DOCUMENTS

| | | | |
|---|---|---|---|
| 2012/0108701 A1 | 5/2012 | Lim et al. | |
| 2013/0109792 A1 | 5/2013 | Hoerold | |
| 2013/0190432 A1* | 7/2013 | Krause | C08K 3/22 524/133 |
| 2015/0126652 A1* | 5/2015 | Adur | C08J 3/226 525/190 |
| 2016/0009918 A1 | 1/2016 | Hoerold | |
| 2017/0362433 A1* | 12/2017 | Chen | B29C 48/9135 |
| 2019/0153197 A1 | 5/2019 | Krause et al. | |
| 2021/0189123 A1 | 6/2021 | Hoerold | |

FOREIGN PATENT DOCUMENTS

| | | |
|---|---|---|
| DE | 2447727 A1 | 4/1976 |
| DE | 4221969 A1 | 1/1994 |
| DE | 19614424 A1 | 10/1997 |
| DE | 19734437 A1 | 2/1999 |
| DE | 19737727 A1 | 7/1999 |
| DE | 19933901 A1 | 2/2001 |
| DE | 10335814 A1 | 3/2004 |
| DE | 102016203221 A1 | 8/2017 |
| EP | 0699708 B1 | 3/1996 |
| EP | 0837100 A1 | 4/1998 |
| JP | 851-54657 A | 5/1976 |
| JP | 2012-530172 A | 11/2012 |
| JP | 2013-538926 A | 10/2013 |
| JP | 2017-517604 A | 6/2017 |
| KR | 10-2012-0023808 A | 3/2012 |
| KR | 10-2015-0126932 A | 11/2015 |
| WO | 97/023565 A1 | 7/1997 |
| WO | 97/39053 A1 | 10/1997 |
| WO | 98/39306 A1 | 9/1998 |
| WO | 2012007124 A1 | 1/2012 |
| WO | 2012/045414 A1 | 4/2012 |
| WO | 2013/030024 A1 | 3/2013 |
| WO | 2014135256 A1 | 9/2014 |

OTHER PUBLICATIONS

International Search Report PCT dated Feb. 13, 2019 in corresponding PCT Application No. PCT/EP2018/077483.
Chinese Office Action dated Jul. 2, 2021 in corresponding Chinese Patent Application No. 201880067347.4.
Indian Office Action dated Nov. 30, 2021 in corresponding Indian Patent Application No. 202017020163.
German Office Action dated Jan. 22, 2018 in corresponding German Patent Application No. 102017218453.1.
Office Action dated Feb. 21, 2023, issued in corresponding Korean Patent Application No. 10-2020-7014097.
Office Action dated Oct. 19, 2022, issued in corresponding Japanese Patent Application No. 2020-520768.
Kunststoff-Handbuch [Plastics Handbook] vol. VIII, pp. 695-710, Karl-Hanser-Verlag, Munich (1973).

* cited by examiner

FLAME-RETARDANT AND COLOR-STABLE POLYAMIDE MOLDING COMPOUNDS

The invention relates to flame-retardant and color-stable polyamide molding compounds and to the use thereof.

For thermoplastic polymers, the salts of phosphinic acids (phosphinates) have been found to be effective flame-retardant additives (EP-A-0699708, DE-A-2252258, and DE-A-2447727). Synergistic combinations of phosphinates with particular nitrogen-containing compounds act more effectively as flame retardants in a range of polymers than the phosphinates alone (PCT/EP97/01664, DE-A-19734437, and DE-A-19737727).

DE-A-19614424 describes phosphinates in conjunction with nitrogen synergists in polyesters and polyamides. DE-A-19933901 describes phosphinates in combination with melamine polyphosphate as flame retardants for polyesters and polyamides, although partial degradation of the polymer and also polymer discoloration occur, particularly at high processing temperatures, and also exudation when stored in damp, warm conditions.

For further improvement of thermal stability, WO-A-2012/045414 uses the combination of a phosphinic salt with a salt of phosphorous acid. The flame retardancy of the phosphinic salts is distinctly improved by this, particularly in aliphatic polyamides. Compared to the use of melamine polyphosphate as synergist, no exudation after storage in damp, warm conditions is observed.

WO-A-2014/135256 describes flame-retardant polyamides comprising a phosphinic salt, a salt of phosphorous acid as synergist, and also reinforcers and further additives. The polyamide molding compounds thus obtained show good thermal stability and no tendency to migrate. The UL 94 V-0 fire classification is achieved, as is a creep resistance (comparative tracking index, CTI) of 600 volts.

However, on storing dark-colored polyamide molding compounds containing phosphinates as flame retardants in water, a change in color is observed, in particular a change in the color of black molding compounds to gray. This effect occurs with reinforced and unreinforced polyamides after storage of test specimens for 1 to 7 days in water at room temperature. This can be a problem particularly in automotive applications when the resistance of polymer molding compounds to various media, for example windshield wiper fluid, is tested.

It was therefore an object of the present invention to provide flame-retardant polyamides that, alongside halogen-free flame retardancy, have high color stability when stored in water, good mechanical properties, and low exudation, and achieve UL 94 V-0 and GWFI 960° C. for a wall thickness from 3.2 mm to 0.4 mm.

This object is achieved by adding at least one further polymer component other than a polyamide to polyamides containing phosphinates, and optionally synergists as flame retardants, and also optionally using a compatibilizer for the polymer components.

The Subject Matter of the Invention is Therefore a Flame-Retardant Polyamide Composition Comprising
as component A) 1% to 96% by weight of one or more thermoplastic polyamides,
as component B) 2% to 25% by weight of a dialkylphosphinic salt of the formula (I)

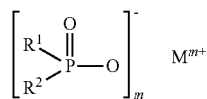   (I)

in which
$R^1$ and $R^2$ are the same or different and are $C_1$-$C_{18}$ alkyl in linear, branched or cyclic form, $C_6$-$C_{18}$ aryl, $C_7$-$C_{18}$ arylalkyl, and/or $C_7$-$C_{18}$ alkylaryl,
M is Mg, Ca, Al, Sb, Sn, Ge, Ti, Zn, Fe, Zr, Ce, Bi, Sr, Mn, Li, Na, K, and/or a protonated nitrogen base;
m is 1 to 4;
n is 1 to 4,
as component C) 2-20% by weight of at least one further polymer component selected from the thermoplastic polyester and polyester elastomer classes, as component D) 0 to 20% by weight of a salt of phosphorous acid of the formula (II)

$$[HP(=O)O_2]^{2-}M^{m+} \quad\quad\quad (II)$$

in which
M is Mg, Ca, Al, Sb, Sn, Ge, Ti, Zn, Fe, Zr, Ce, Bi, Sr, Mn, Li, Na, and/or K, as component E) 0% to 20% by weight of one or more condensation products of melamine and/or reaction products of melamine with phosphoric acids and/or melamine cyanurate,
as component F) 0% to 50% by weight of filler and/or reinforcer,
as component G) 0-5% of a compatibilizer for the polymer components
as component H) 0% to 2% by weight of phosphite or phosphonite or mixtures thereof, and as component I) 0% to 2% by weight of an ester or salt of long-chain aliphatic carboxylic acids (fatty acids) typically having chain lengths of $C_{14}$ to $C_{40}$, wherein the sum total of the components is always 100% by weight.

The polyamides are preferably nylon 6 or nylon 66 or mixtures of nylon 6 with nylon 66 and/or polyphthalamide.

$R^1$, $R^2$ in formula (I) are preferably the same or different and are methyl, ethyl, n-propyl, isopropyl, n-butyl, tert-butyl, n-pentyl, hexyl, and/or phenyl.

The thermoplastic polyesters and polyester elastomers are preferably polyalkylene terephthalates.

The polyalkylene terephthalates preferably comprise polyethylene terephthalate, polybutylene terephthalate, and/or copolyester elastomers.

Component D) preferably comprises reaction products of phosphorous acid with aluminum compounds.

Component D) particularly preferably comprises aluminum phosphite [$Al(H_2PO_3)_3$], secondary aluminum phosphite [$Al_2(HPO_3)_3$], basic aluminum phosphite [$Al(OH)(H_2PO_3)_2*2aq$], aluminum phosphite tetrahydrate [$Al_2(HPO_3)_3*4aq$], aluminum phosphonate, $Al_{17}(HPO_3)_9(OH)_6(1,6\text{-hexanediamine})_{1.5}*12H_2O$, $Al_2(HPO_3)_3*xAl_2O_3*nH_2O$ where $x=1\text{-}2.27$ and $n=1\text{-}50$, and/or $Al_4H_6P_{16}O_{18}$ or aluminum phosphites of the formulas (III), (IV), and/or (V), where
formula (III) comprises: $Al_2(HPO_3)_3x(H_2O)_q$
and
q is 0 to 4;
formula (IV) comprises $Al_{2.00}M_z(HPO_3)_y(OH)_vx(H_2O)_w$ and
M represents alkali metal ions,
z is 0.01 to 1.5,
y is 2.63 to 3.5,
v is 0 to 2, and
w is 0 to 4;
formula (V) comprises $Al_{2.00}(HPO_3)_u(H_2PO_3)_t x(H_2O)_s$ and
u is 2 to 2.99 and
t is 2 to 0.01, and
s is 0 to 4, or the aluminum phosphite comprises mixtures of aluminum phosphite of the formula (III) with sparingly soluble aluminum salts and nitrogen-free extraneous ions, mixtures of aluminum phosphite of the formula (IIII) with aluminum salts, mixtures of aluminum phosphite of the formulas (III) to (V) with aluminum phosphite [$Al(H_2PO_3)_3$], with secondary aluminum phosphite [$Al_2(HPO_3)_3$], with basic aluminum phosphite [$Al(OH)(H_2PO_3)_2 \cdot 2aq$], with aluminum phosphite tetrahydrate [$Al_2(HPO_3)_3 \cdot 4aq$], with aluminum phosphonate, with $Al_7(HPO_3)_9(OH)_6(1,6\text{-hexanediamine})_{1.5} \cdot 12H_2O$, with $Al_2(HPO_3)_3 \cdot xAl_2O_3 \cdot nH_2O$ where $x=1\text{-}2.27$ and $n=1\text{-}50$, and/or with $Al_4H_6P_{16}O_{18}$.

Component E) preferably comprises condensation products of melamine and/or reaction products of melamine with polyphosphoric acid and/or reaction products of condensation products of melamine with polyphosphoric acid or mixtures thereof; melem, melam, melon, dimelamine pyrophosphate, melamine polyphosphate, melem polyphosphate, melam polyphosphate, melon polyphosphate, and/or mixed polysalts thereof; nitrogen-containing phosphates of the formulas $(NH_4)_yH_{3-y}PO_4$ or $(NH_4PO_3)_z$, where y is 1 to 3 and z is 1 to 10 000.

Component E) preferably comprises glass fibers, glass beads, and/or mineral fillers.

Component G) preferably comprises phthalic anhydride, pyromellitic anhydride, trimellitic anhydride, polyolefins grafted with maleic anhydride; epoxy compounds, epoxy-functional acrylates, bisoxazolines, carbodiimides, diisocyanates, and/or diurethanes.

The phosphonites (component H) are preferably those of the general structure

R—[P(OR$^5$)$_2$]$_m$      (VI), where
R is a mono- or polyvalent aliphatic, aromatic or heteroaromatic organic radical and
R$^5$ is a compound of the structure (VII)

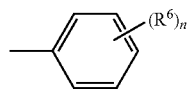

(VII)

or the two R$^5$ radicals form a bridging group of the structure (VIII)

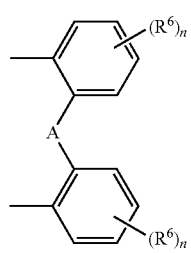

(VIII)

where
A is a direct bond, O, S, $C_{1-18}$ alkylene (linear or branched), $C_{1-18}$ alkylidene (linear or branched), in which
R$^6$ is independently $C_{1-12}$ alkyl (linear or branched), $C_{1-12}$ alkoxy, and/or $C_{5-12}$ cycloalkyl, and
n is 0 to 5 and
m is 1 to 4.

Component I) preferably comprises alkali metal, alkaline earth metal, aluminum, and/or zinc salts of long-chain fatty acids having 14 to 40 carbon atoms and/or reaction products of long-chain fatty acids having 14 to 40 carbon atoms with polyhydric alcohols such as ethylene glycol, glycerol, trimethylolpropane, and/or pentaerythritol.

The flame-retardant polyamide composition of the invention preferably comprises, in accordance with at least one of claims 1 to 12,
  30% to 79.9% by weight of component A),
  5% to 20% by weight of component B),
  5% to 20% by weight of component C),
  0% to 20% by weight of component D),
  0% to 20% by weight of component E),
  10% to 40% by weight of component F),
  0% to 20% by weight of component G),
  0% to 2% by weight of component H), and
  0.1% to 2% by weight of component I).

The flame-retardant polyamide composition particularly preferably comprises, in accordance with at least one of claims 1 to 12,
  30% to 74.6% by weight of component A),
  5% to 20% by weight of component B),
  5% to 20% by weight of component C),
  0% to 20% by weight of component D),
  0% to 20% by weight of component E),
  15% to 35% by weight of component F),
  0.3% to 10% by weight of component G),
  0% to 2% by weight of component H), and
  0.1% to 2% by weight of component I).

In particular, the flame-retardant polyamide composition comprises, in accordance with at least one of claims 1 to 12,
  30% to 71.6% by weight of component A),
  5% to 20% by weight of component B),
  5% to 20% by weight of component C),
  3% to 10% by weight of component D),
  0% to 20% by weight of component E),
  15% to 35% by weight of component F),
  0.3% to 10% by weight of component G),
  0% to 2% by weight of component H), and
  0.1% to 2% by weight of component I).

In a further embodiment, the flame-retardant polyamide composition of the invention comprises, in accordance with at least one of claims 1 to 12,
  30% to 71.6% by weight of component A),
  5% to 20% by weight of component B),
  5% to 20% by weight of component C),
  0% to 10% by weight of component D),
  3% to 10% by weight of component E),
  15% to 35% by weight of component F),
  0.3% to 10% by weight of component G),
  0% to 2% by weight of component H), and
  0.1% to 2% by weight of component I).

In particular, a flame-retardant polyamide composition is also likewise in accordance with at least one of claims 1 to 12, which comprises
  30% to 71.4% by weight of component A),
  5% to 20% by weight of component B),
  5% to 20% by weight of component C),
  0.1% to 10% by weight of component D),
  3% to 10% by weight of component E),
  15% to 35% by weight of component F),
  0.3% to 10% by weight of component G),
  0.1% to 2% by weight of component H), and
  0.1% to 2% by weight of component I).

The flame-retardant polyamide composition preferably further comprises telomers, wherein the telomers are ethylbutylphosphinic acid, dibutylphosphinic acid, ethylhexylphosphinic acid, butylhexylphosphinic acid, ethyloctylphosphinic acid, sec-butylethylphosphinic acid, (1-ethylbutyl)butylphosphinic acid, ethyl(1-methylpentyl) phosphinic acid, di-sec-butylphosphinic acid (di-1-methylpropylphosphinic acid), propyl(hexyl)phosphinic acid, dihexylphosphinic acid, hexyl(nonyl)phosphinic acid, dinonylphosphinic acid, and/or salts thereof with the metals Mg, Ca, Al, Sb, Sn, Ge, Ti, Zn, Fe, Zr, Ce, Bi, Sr, Mn, Li, Na, K, and the telomers are different from component A).

The flame-retardant polyamide composition preferably additionally comprises zinc oxide, zinc borate, and/or zinc stannate.

The flame-retardant polyamide composition preferably comprises further additives, wherein the further additives are selected from the group consisting of antioxidants, UV stabilizers, gamma-ray stabilizers, hydrolysis stabilizers, co-stabilizers for antioxidants, antistats, emulsifiers, nucleating agents, plasticizers, processing auxiliaries, impact modifiers, dyes, pigments, and/or further flame retardants other than components B), D), E), F), H), and I).

The flame-retardant polyamide composition of the invention preferably comprises, as a further component, iron in the form of an iron-containing substance, wherein the amount of iron-containing substance is 0.0001% to 10% by weight of the total mixture.

The invention also relates to the use of a flame-retardant polyamide composition as claimed in one or more of claims 1 to 21 in the electricals and electronics sector, in or for plug connectors, current-bearing components in power distributors (residual current protection), circuit boards, potting compounds, power connectors, circuit breakers, lamp housings (LED housings), capacitor housings, coil elements, and ventilators for grounding contacts, plugs, in/on printed circuit boards, housings for plugs, cables, flexible circuit boards, charging cables for mobile phones, motor covers, textile coatings, and other products.

In the abovementioned uses, the polyamides are preferably in the form of shaped bodies, films, filaments, foils, and/or fibers.

Finally, the invention also relates to a three-dimensional article comprising the flame-retardant polyamide composition as claimed in one or more of claims 1 to 21, wherein said article is a shaped body, injection molding, extrusion compound, and/or extrudate.

It was surprisingly found that inventive combinations of polyamides with further polymers other than polyamide, in particular polyesters, and with salts of dialkylphosphinic acids have good flame retardancy allied with improved color stability when stored in water. In addition, high surface quality, good processability, and high long-term stability are achieved. So-called compatibilizers may be added to improve the compatibility of the two polymer components.

DE-A-4221969 describes polyamide-polyester blends having improved phase compatibility in which 1-10% by mass, based on the polyamide component, of cyclic carboxylic anhydride and 0.1-5% by mass of diisocyanate or diurethane, based on the total polymer component, are added.

WO-A-2013/030024 describes flame-retardant polyamide/polyester blends, in particular with red phosphorus as a flame retardant. Use of an impact modifier achieves good mechanical values, high CTI and GWIT. There is no information on the color stability or water absorption. A component containing epoxy groups for imparting compatibility is expressly excluded; if such a component is used, no UL94 V-0 and no GWIT is achieved.

WO-A-1997/023565 describes the use of melamine pyrophosphate as a flame retardant in polyamides and polyesters, including for PA/PBT blends. With 20% glass fibers and 32% melamine pyrophosphate, UL94 V-0 is achieved at 1.6 mm.

EP-A-0837100 describes thermoplastic flame-retardant resins with red phosphorus and polyethylene terephthalate and with a further thermoplastic other than polyethylene terephthalate. A combination of PA 6 or PA 66 with PET achieves UL94 V-0 and shows only minimal exudation.

US-A-2001/007888 describes thermoplastic resins consisting of an aromatic polyester and a polyamide, a rubber-containing polymer component, a polyphenylene ether, and a halogen-free flame retardant. In the examples, red phosphorus or a calcium hypophosphite is used as the flame retardant. The presence of the rubber-containing polymer component and the polyphenylene ether is essential in order to achieve UL94 V-0 and good mechanical properties.

Another advantage of the inventive combinations of polyamides with further polymers other than polyamide, in particular polyesters, and with salts of dialkylphosphinic acids is their general colorability. When using red phosphorus as a flame retardant, on the other hand, adjustment only to dark or very dark shades is possible.

The polyamide (PA) is preferably selected from the group consisting of PA 6, PA 6,6, PA 4,6, PA 12, PA 6,10, PA 4,10, PA 10,10, PA 11, PA 6T/66, PA 6T/6, PA 4T, PA 9T, PA 10T, polyamide copolymers, polyamide blends, and combinations thereof.

Component A) is preferably nylon 66 or copolymers or polymer blends of nylon 66 and nylon 6.

M in formula (I) is preferably aluminum.

Component C is preferably a thermoplastic polyester selected from the group of polyalkylene terephthalates. Polyalkylene terephthalates in the context of the invention are reaction products of aromatic dicarboxylic acids or their reactive derivatives (for example dimethyl esters or anhydrides) and aliphatic, cycloaliphatic or araliphatic diols and mixtures of these reaction products.

Polyalkylene terephthalates used with preference in accordance with the invention may be prepared by known methods (Kunststoff-Handbuch [Plastics Handbook], vol. VIII, pp. 695-710, Karl-Hanser-Verlag, Munich 1973) from terephthalic acid (or its reactive derivatives) and aliphatic or cycloaliphatic diols having 2 to 10 carbon atoms.

Polyalkylene terephthalates used with preference in accordance with the invention contain at least 80 mol %, preferably 90 mol %, based on the dicarboxylic acid, of terephthalic acid radicals.

In addition to terephthalic ester radicals, the polyalkylene terephthalates used with preference in accordance with the invention may contain up to 20 mol % of radicals of other aromatic dicarboxylic acids having 8 to 14 carbon atoms or radicals of aliphatic dicarboxylic acids having 4 to 12 carbon atoms, such as radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid, cyclohexanedicarboxylic acid.

Polyalkylene terephthalates used with preference in accordance with the invention are also copolyesters prepared from at least two of the abovementioned acid components and/or from at least two of the abovementioned alcohol components and/or butane-1,4-diol. Particularly preferred copolyesters are poly(ethylene glycol/butane-1,4-diol) terephthalates.

Component E) preferably comprises condensation products of melamine such as melem, melam, melon and/or reaction products of melamine with polyphosphoric acid and/or reaction products of condensation products of melamine with polyphosphoric acid or mixtures thereof.

Reaction products with phosphoric acid or condensed phosphoric acids are understood as meaning compounds that form through reaction with phosphoric acid of melamine or condensed melamine compounds such as melam, melem or melon, etc. Examples thereof are dimelamine phosphate, dimelamine pyrophosphate, melamine phosphate, melamine pyrophosphate, melamine polyphosphate, melam polyphosphate, melon polyphosphate, and melem polyphosphate, or mixed polysalts, as described for example in WO-A-98/39306.

Component E) is particularly preferably melamine polyphosphate.

The reinforcing filler or reinforcer (component F) particularly preferably comprises glass fibers. In addition, glass beads, glass fibers with aspect ratios or mineral fillers such as talc, wollastonite or chalk may preferably be used.

Component G) preferably comprises compounds that react with terminal amino groups of the polyamide and/or terminal acid groups, such as phthalic anhydride, pyromellitic anhydride, trimellitic anhydride, polyolefins grafted with maleic anhydride, epoxy compounds, epoxy-functional acrylates, bisoxazolines or carbodiimides, diisocyanates or diurethanes.

Particular preference is given to using glycidyl methacrylate-polyethylene copolymers, which are obtainable for example from Arkema under the trade name Lotader® AX.

Particular preference is given to using glycidyl methacrylate-acrylate-styrene copolymers such as those obtainable from BASF under the name Joncryl® ADR.

Preference is given to using, as component H), phosphites of the formula (IX)

where $R_1$ is a compound of the structure (VII)

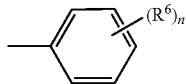 

where $R^6$ is $C_{1-12}$ alkyl (linear or branched), $C_{1-12}$ alkoxy, and/or $C_{5-12}$ cycloalkyl.

Component I) preferably comprises alkali metal, alkaline earth metal, aluminum, and/or zinc salts of long-chain fatty acids having 14 to 40 carbon atoms and/or reaction products of long-chain fatty acids having 14 to 40 carbon atoms with polyhydric alcohols such as ethylene glycol, glycerol, trimethylolpropane, and/or pentaerythritol.

The polymer is particularly preferably one or more polyamides, which may be provided with fillers and/or reinforcers.

The polyamides are preferably in the form of shaped bodies, films, filaments, and/or fibers.

Component D) is particularly preferably a reaction product of phosphorous acid and an aluminum compound.

Preference is given to aluminum phosphites having the CAS numbers 15099-32-8, 119103-85-4, 220689-59-8, 56287-23-1, 156024-71-4, 71449-76-8, and 15099-32-8.

Suitable phosphinates are described in PCT/WO97/39053, which is explicitly incorporated by reference.

Particularly preferred phosphinates are aluminum, calcium, and zinc phosphinates.

In the application, particular preference is given to using the same salt of phosphinic acid as of phosphorous acid, i.e., for example, aluminum dialkylphosphinate together with aluminum phosphite or zinc dialkylphosphinate together with zinc phosphite.

Further additives may be added to the inventive combination of components A), B), and C), and optionally D), E), F), G), H), and I), for example antioxidants, UV absorbers and light stabilizers, metal deactivators, peroxide-destroying compounds, polyamide stabilizers, basic costabilizers, nucleating agents, fillers and reinforcers, further flame retardants, and other added substances.

Examples of suitable antioxidants are alkylated monophenols, for example 2,6-di-tert-butyl-4-methylphenol; 1.2 alkylthiomethylphenols, for example 2,4-dioctylthiomethyl-6-tert-butylphenol; hydroquinones and alkylated hydroquinones, for example 2,6-di-tert-butyl-4-methoxyphenol; tocopherols, for example α-tocopherol, β-tocopherol, γ-tocopherol, δ-tocopherol, and mixtures thereof (vitamin E); hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide; alkylidenebisphenols, for example 2,2'-methylenebis(6-tert-butyl-4-methylphenol); O-, N-, and S-benzyl compounds, for example 3,5,3',5'-tetra-tert-butyl-4,4'-dihydroxydibenzyl ether; hydroxybenzylated malonates, for example dioctadecyl 2,2-bis(3,5-di-tert-butyl-2-hydroxybenzyl)malonate; hydroxybenzyl aromatics, for example 1,3,5-tris-(3,5-di-tert-butyl)-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris-(3,5-di-tert-butyl-4-hydroxybenzyl)phenol; triazine compounds, for example 2,4-bisoctylmercapto-6-(3,5-di-tert-butyl-4-hydroxyanilino)-1,3,5-triazine, benzyl phosphonates, for example dimethyl 2,5-di-tert-butyl-4-hydroxybenzylphosphonate; acylaminophenols, 4-hydroxylauramide, 4-hydroxystearanilide, octyl N-(3,5-di-tert-butyl-4-hydroxyphenyl)carbamate; esters of β-(3,5-di-tert-butyl-4-hydroxyphenyl)propionic acid with mono- or polyhydric alcohols; esters of β-(5-tert-butyl-4-hydroxy-3-methylphenyl)propionic acid with mono- or polyhydric alcohols; esters of β-(3,5-dicyclohexyl-4-hydroxyphenyl)propionic acid with mono- or polyhydric alcohols; esters of 3,5-di-tert-butyl-4-hydroxyphenylacetic acid with mono- or polyhydric alcohols; amides of β-(3,5-di-tert-butyl-4-hydroxyphenyl)propionic acid, for example N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine, N,N'-bis(3,5-di-tert-butyl-4-hydroxyphenylpropionyl)hydrazine.

Examples of suitable UV absorbers and light stabilizers are 2-(2'-hydroxyphenyl)benzotriazoles, for example 2-(2'-hydroxy-5'-methylphenyl)benzotriazole, 2-hydroxybenzophenones, for example the 4-hydroxy, 4-methoxy, 4-octoxy, 4-decyloxy, 4-dodecyloxy, 4-benzyloxy, 4,2',4-trihydroxy, 2'-hydroxy-4,4'-dimethoxy derivative;

esters of optionally substituted benzoic acids, for example 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-ditert-butyl-4-hydroxybenzoate; acrylates, for example ethyl or isooctyl α-cyano-β,β-diphenylacrylate, methyl α-carbomethoxycinnamate, methyl or butyl α-cyano-β-methyl-p-methoxycinnamate, methyl α-carbomethoxy-p-methoxycinnamate, N-(β-carbomethoxy-β-cyanovinyl)-2-methylindoline.

In addition, nickel compounds, for example nickel complexes of 2,2'-thiobis[4(1,1,3,3-tetramethylbutyl)phenol], such as the 1:1 or the 1:2 complex, optionally with additional ligands such as n-butylamine, triethanolamine or N-cyclohexyldiethanolamine, nickel dibutyldithiocarbamate, nickel salts of 4-hydroxy-3,5-di-tert-butylbenzylphosphonic acid monoalkyl esters, such as those of the methyl or ethyl ester, nickel complexes of ketoximes, such as those of 2-hydroxy-4-methylphenyl undecyl ketoxime, nickel complexes of 1-phenyl-4-lauroyl-5-hydroxypyrazole, optionally with additional ligands; sterically hindered amines, for example bis(2,2,6,6-tetramethylpiperidyl) sebacate; oxamides, for example 4,4'-dioctyloxyoxanilide; 2-(2-hydroxyphenyl)-1,3,5-triazines, for example 2,4,6-tris(2-hydroxy-4-octyloxyphenyl)-1,3,5-triazine.

Examples of suitable metal deactivators are N,N'-diphenyloxamide, N-salicylal-N'-salicyloylhydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalic dihydrazide, oxanilide, isophthalic dihydrazide, sebacic bisphenylhydrazide, N,N'-diacetyladipic dihydrazide, N,N'-bis(salicyloyl)oxalic dihydrazide, N,N'-bis(salicyloyl)thiopropionic dihydrazide.

Examples of suitable peroxide-destroying compounds are esters of β-thiodipropionic acid, for example the lauryl, steelyl, myristyl or tridecyl esters, mercaptobenzimidazole, the zinc salt of 2-mercaptobenzimidazole, zinc dibutyldithiocarbamate, dioctadecyl disulfide, pentaerythrityl tetrakis(β-dodecylmercapto)propionate.

Examples of suitable polyamide stabilizers are copper salts in combination with iodides and/or phosphorus compounds and salts of divalent manganese.

Suitable basic costabilizers are melamine, polyvinylpyrrolidone, dicyandiamide, triallyl cyanurate, urea derivatives, hydrazine derivatives, amines, polyamides, polyurethanes, alkali metal and alkaline earth metal salts of higher fatty acids, for example calcium stearate, zinc stearate, magnesium behenate, magnesium stearate, sodium ricinoleate, potassium palmitate, antimony catecholate or tin catecholate.

Examples of suitable nucleating agents are 4-tert-butylbenzoic acid, adipic acid, and diphenylacetic acid.

Examples of fillers and reinforcers include calcium carbonate, silicates, glass fibers, asbestos, talc, kaolin, mica, barium sulfate, metal oxides and hydroxides, carbon black, graphite, and others.

Examples of suitable further flame retardants are aryl phosphates, phosphonates, phosphazenes, salts of hypophosphorous acid, and red phosphorus.

Also suitable as further flame retardants are salts of aliphatic and aromatic sulfonic acids and mineral flame retardant additives such as aluminum hydroxide and/or magnesium hydroxide, calcium magnesium carbonate hydrates. Also useful are flame retardant synergists from the group of the oxygen-, nitrogen- or sulfur-containing metal compound, preferably zinc oxide, zinc borate, zinc stannate, zinc hydroxystannate, zinc sulfide, molybdenum oxide, titanium dioxide, magnesium oxide, magnesium carbonate, calcium carbonate, calcium oxide, titanium nitride, boron nitride, magnesium nitride, zinc nitride, zinc phosphate, calcium phosphate, calcium borate, magnesium borate or mixtures thereof, and also char formers such as phenol-formaldehyde resins, polycarbonates, polyimides, polysulfones, polyethersulfones or polyetherketones, and antidrip agents, especially tetrafluoroethylene polymers.

Examples of other added substances include plasticizers, expandable graphite, lubricants, emulsifiers, pigments, optical brighteners, flame retardants, antistats, blowing agents.

These additional additives may be added to the polymers before, together with or after addition of the flame retardants. These additives and also the flame retardants may be metered in as solids, in a solution or melt, or else in the form of solid or liquid mixtures or as masterbatches/concentrates.

Suitable as component I) are esters or salts of long-chain aliphatic carboxylic acids (fatty acids) typically having chain lengths of $C_{14}$ to $C_{40}$. The esters are reaction products of the mentioned carboxylic acids with common polyhydric alcohols, for example ethylene glycol, glycerol, trimethylolpropane or pentaerythritol. Useful salts of the mentioned carboxylic acids are in particular alkali metal or alkaline earth metal salts or aluminum and zinc salts.

Component I) preferably comprises esters or salts of stearic acid, for example glyceryl monostearate or calcium stearate.

Component I) preferably comprises reaction products of montan wax acids with ethylene glycol.

The reaction products preferably comprise a mixture of ethylene glycol montan wax monoester, ethylene glycol montan wax diester, montan wax acids, and ethylene glycol.

Component I) preferably comprises reaction products of montan wax acids with a calcium salt.

The reaction products particularly preferably comprise a mixture of butane-1,3-diol montan wax monoester, butane-1,3-diol montan wax diester, montan wax acids, 1,3-butanediol, calcium montanate, and the calcium salt.

As stated earlier, the flame-retardant polyamide composition of the invention may comprise, as a further component, iron in the form of an iron-containing substance, wherein the amount of iron-containing substance is 0.0001% to 10% by weight of the total mixture.

The iron may here be incorporated isostructurally in an aluminum phosphinate according to formula (I) or may be present in the form of a nonionically incorporated iron salt, i.e. as a distinct chemical species.

Suitable are iron(II) salts and/or iron(III) salts with inorganic anions of the seventh main group (halides), for example fluorides, chlorides, bromides, iodides; with anions of oxo acids of the seventh main group (hypohalites, halites, halogenates, for example iodate, perhalogenates, for example perchlorate); with anions of the sixth main group (chalcogenides), for example oxides, hydroxides, peroxides, superoxides; with anions of oxo acids of the sixth main group (sulfates, hydrogen sulfates, sulfate hydrates, sulfites, peroxosulfates); with anions of the fifth main group (pnicogenides), for example nitrides, phosphides; with anions of oxo acids of the fifth main group (nitrate, nitrate hydrates, nitrites, phosphates, peroxophosphates, phosphites, hypophosphites, pyrophosphates); with anions of oxo acids of the fourth main group (carbonates, hydrogen carbonates, hydroxide carbonates, carbonate hydrates, silicates, hexafluorosilicates, hexafluorosilicate hydrates, stannates); with anions of oxo acids of the third main group (borates, polyborates, peroxoborates); with anions of the pseudohalides (thiocyanates, cyanates, cyanides); with anions of oxo acids of the transition metals (chromates, chromites, molybdates, permanganate).

Also suitable are iron(II) salts and/or iron(III) salts having organic anions from the group of the mono-, di-, oligo-, and polycarboxylic acids (salts of formic acid (formates)), of acetic acid (acetates, acetate hydrates), of trifluoroacetic acid (trifluoroacetate hydrates), propionates, butyrates, valerates, caprylates, oleates, stearates, of oxalic acid (oxalates), of tartaric acid (tartrates), citric acid (citrates, basic citrates, citrate hydrates), benzoic acid (benzoates), salicylates, lactic acid (lactate, lactate hydrates), acrylic acid, maleic acid, succinic acid, of amino acids (glycine), of acidic hydroxo functions (phenoxides, etc.), para-phenolsulfonates, para-phenolsulfonate hydrates, acetylacetonate hydrates, tannates, dimethyldithiocarbamates, trifluoromethanesulfonate, alkylsulfonates, and/or aralkylsulfonates.

Preferred are iron(II) and/or iron(III) borates, sulfates, sulfate hydrates, hydroxosulfate hydrates, mixed hydroxosulfate hydrates, oxysulfates, acetates, nitrates, fluorides, fluoride hydrates, chlorides, chloride hydrates, oxychlorides, bromides, iodides, iodide hydrates, and/or carboxylic acid derivatives; iron(II) and/or iron(III) acetates, chlorides, nitrates, sulfates, phosphinates, monoalkyl phosphinates, and/or alkylphosphonates.

Particularly preferred iron salts are iron(II) monoalkylphosphinates, which include iron(II) ethylphosphinate, iron(II) propylphosphinate, iron(II) butylphosphinate, iron (II) n-butylphosphinate, iron(II) sec-butylphosphinate, iron (II) hexylphosphinate, and/or iron(II) octylphosphinate.

Preferred iron salts are iron(III) monoalkylphosphinates, which include iron(III) ethylphosphinate, iron(III) propylphosphinate, iron(III) butylphosphinate, iron(III) n-butylphosphinate, iron(III) sec-butylphosphinate, iron(III) hexylphosphinate, and/or iron(III) octylphosphinate.

Preferred iron salts are iron(II) alkylphosphonates, which include iron(II) ethylphosphonate, iron(II) propylphosphonate, iron(II) butylphosphonate, iron(II) n-butylphosphonate, iron(II) sec-butylphosphonate, iron(II) hexylphosphonate, and/or iron(II) octylphosphonate.

Preferred iron salts are iron(III) alkylphosphonates, which include iron(III) ethylphosphonate, iron(III) propylphosphonate, iron(III) butylphosphonate, iron(III) n-butylphosphonate, iron(III) sec-butylphosphonate, iron(III) hexylphosphonate, and/or iron(III) octylphosphonate.

Preferred coprecipitated iron salts are iron(II) dialkylphosphinates, which include iron(II) bis(diethylphosphinate), iron(II) bis(dipropylphosphinate), iron(II) bis(butylethylphosphinate), iron(II) bis(n-butylethylphosphinate), iron(II) bis(sec-butylethylphosphinate), iron(II) bis(hexylethylphosphinate), iron(II) bis(dibutylphosphinate), iron(II) bis(hexylbutylphosphinate), and/or iron(II) bis(octylethylphosphinate).

Preferred iron salts are iron(III) dialkylphosphinates, which include iron(III) tris(diethylphosphinate), iron(III) tris(dipropylphosphinate), iron(III) tris(butylethylphosphinate), iron(III) tris(n-butylethylphosphinate), iron(III) tris (sec-butylethylphosphinate), iron(III) tris(hexylethylphosphinate), iron(III) tris(dibutylphosphinate), iron(III) tris (hexylbutylphosphinate), and/or iron(III) tris (octylethylphosphinate).

The proportions in the polyamide molding compound of components A), B), and C) and optionally D), E), F), G), H), and I) depend essentially on the envisaged field of use and can vary within wide limits.

The abovementioned additives may be introduced into the polymer in a wide variety of different process steps. For instance, it is possible in the case of polyamides, to mix the additives into the polymer melt at the start or at the end of the polymerization/polycondensation or in a subsequent compounding operation. In addition, there are processing operations in which the additives are not added until a later stage. This is practiced especially when using pigment or additive masterbatches. There is also the possibility of applying additives, particularly in powdered form, to the polymer pellets, which may be warm as a result of the drying operation, by drum application.

The polyamides are preferably those that derive from diamines and dicarboxylic acids and/or from aminocarboxylic acids or the corresponding lactams, such as nylon 2/12, nylon 4 (poly-4-aminobutyric acid, Nylon® 4, from DuPont), nylon 4/6 (poly(tetramethylene adipamide)), poly (tetramethylene adipic diamide), Nylon® 4/6, from DuPont), nylon 6 (polycaprolactam, poly-6-aminohexanoic acid, Nylon® 6, from DuPont, Akulon e K122, from DSM; Zytel® 7301, from DuPont; Durethan® B 29, from Bayer), nylon 6/6 ((poly(N,N'-hexamethylene adipamide)), Nylon® 6/6, from DuPont, Zytel® 101, from DuPont; Durethan® A30, Durethan® AKV, Durethan® AM, from Bayer; Ultramid® A3, from BASF), nylon 6/9 (poly(hexamethylene nonandiamide), Nylon® 6/9, from DuPont), nylon 6/10(poly (hexamethylene sebacamide), Nylon® 6/10, from DuPont), nylon 6/12 (poly(hexamethylene dodecanediamide), Nylon® 6/12, from DuPont), nylon 6/66 (poly(hexamethylene adipamide-co-caprolactam), Nylon® 6/66, from DuPont), nylon 7 (poly-7-aminoheptanoic acid, Nylon® 7, from DuPont), nylon 7,7 (polyheptamethylene pimelamide, Nylon® 7,7, from DuPont), nylon 8 (poly-8-aminooctanoic acid, Nylon® 8, from DuPont), nylon 8,8 (polyoctamethylene suberamide, Nylon® 8,8, from DuPont), nylon 9 (poly-9-aminononanoic acid, Nylon® 9, from DuPont), nylon 9,9 (polynonamethylene azelamide, Nylon® 9,9, from DuPont), nylon 10 (poly-10-aminodecanoic acid, Nylon® 10, from DuPont), nylon 10,9 (poly(decamethylene azelamide), Nylon® 10,9, from DuPont), nylon 10,10 (polydecamethylene sebacamide, Nylon® 10,10, from DuPont), nylon 11 (poly-11-aminoundecanoic acid, Nylon® 11, from DuPont), nylon 12 (polylauryllactam, Nylon® 12, from DuPont, Grilamid® L20, from Ems Chemie), aromatic polyamides based on m-xylene, diamine and adipic acid; polyamides prepared from hexamethylenediamine and iso- and/or terephthalic acid (polyhexamethylene isophthalamide, polyhexamethylene terephthalamide) and optionally an elastomer as a modifier, for example poly-2,4,4-trimethylhexamethylene terephthalamide or poly-m-phenyleneisophthalamide. Block copolymers of the abovementioned polyamides with polyolefins, olefin copolymers, ionomers or chemically bonded or grafted elastomers; or with polyethers, for example with polyethylene glycol, polypropylene glycol or polytetramethylene glycol. In addition, EPDM- or ABS-modified polyamides or copolyamides; and polyamides condensed during processing ("RIM polyamide systems").

The further polymers (component C)) are preferably polyesters that derive from dicarboxylic acids and dialcohols and/or from hydroxycarboxylic acids or the corresponding lactones, such as polyethylene terephthalate, polybutylene terephthalate (Celanex® 2500, Celanex® 2002, from Celanese; Ultradur®, from BASF), poly-1,4-dimethylolcyclohexane terephthalate, polyhydroxybenzoates, and block polyether esters that derive from polyethers having hydroxyl terminal groups;

and also polyesters modified with polycarbonates or MBS. These are preferably polyester elastomers that are produced, for example, from butane-1,4-diol, terephthalic acid, and polytetrahydrofuran (also referred to as poly (tetramethylene ether)glycol) and have hard crystalline tetramethylene glycol terephthalate blocks and soft, amorphous polyalkylene ether terephthalate blocks. They are produced in the melt by transesterification reactions. Trade names include Hytrel®, Arnitel®, and Riteflex®.

The invention finally also relates to a process for producing flame-retardant polymer shaped bodies, wherein inventive flame-retardant polymer molding compounds are processed by injection molding (for example injection-molding machine of the Aarburg Allrounder type) and pressing, foam injection molding, internal gas-pressure injection molding, blow molding, film casting, calendering, laminating or coating at elevated temperatures to give the flame-retardant polymer shaped body.

The polyamides are preferably those of the amino acid type and/or of the diamine-dicarboxylic acid type.

Preferred polyamides are nylon 6 and/or nylon 66 and polyphthalamide.

The polyamides are preferably unmodified, colored, filled, unfilled, reinforced, unreinforced, or otherwise modified.

EXAMPLES

1. Components used
Commercial polymers (pellets):
Polyamides (component A):
Nylon-6,6 (PA 6,6-GR): Ultramid® A27 (from BASF AG, Germany)
Further polymers (component C):
Polyester elastomer (TPE-E): Hytrel® 4056 (from DuPont, USA)
Polyethylene terephthalate: Polyclear® 1101 (from Invista, Germany)
Polybutylene terephthalate: Ultradur® B4500 (from BASF, Germany)
Polystyrene: Styrolution PS 454 N natural (from Ineos, Germany)
ABS: Novodur P2-H (from Styrolution, Germany)
Polyglycol: Polyglycol 8000 P (from Clariant, Germany)
Polycarbonate: Makrolon 3208 (from Covestro, Germany)
Polycaprolactone: PC Resin 2-2 (from Changxing, China)
Component F: PPG HP 3610 EC 10 4.5 mm glass fibers (from PPG Ind. Fiber Glass, the Netherlands)
Flame retardant (component B):
Aluminum salt of diethylphosphinic acid, referred to hereinafter as Depal
Further flame retardants:
Component D: Aluminum salt of phosphorous acid, referred to hereinafter as Phopal
Component E: Melamine polyphosphate (Melapur® 200/70, (from BASF, Germany), referred to as MPP
Compatibilizer (component G):
Zemac® E60, polyethylene with maleic anhydride (Vertellus, USA)
Nexamitee® 56 (Nexam Chemicals, Sweden)
Nexamite® A99 (Nexam Chemicals, Sweden)
Licocene® PE MA 4351 (Clariant, Germany)
Lotader® AX 8700 (Arkema, France)
Trimellitic anhydride
Phosphonites (component H): Sandostab® P-EPQ, from Clariant GmbH, Germany Wax components (component F)):
Licowax® E, from Clariant Produkte (Deutschland) GmbH, Germany (esters of montan wax acid), component I)
2. Production, processing, and testing of flame-retardant polymer molding compounds The flame retardant components were mixed with the phosphonite, lubricants, and stabilizers in the ratio specified in the table and incorporated via the side intake of a twin-screw extruder (Leistritz ZSE 27/44D) into PA 6,6 at temperatures of 260 to 310° C., and into PPA at 300-340° C. The glass fibers were added via a second side intake. The homogenized polymer strand was drawn off, cooled in a water bath, and then pelletized.

After sufficient drying, the molding compounds were processed into test specimens on an injection-molding machine (Arburg 320 C Allrounder) at melt temperatures of 250 to 340° C., and tested and classified for flame retardancy using the UL 94 test (Underwriter Laboratories).

The UL 94 fire classifications are as follows:
V-0: Afterflame time never longer than 10 sec, total of afterflame times for 10 flame applications not more than 50 sec, no flaming drops, no complete consumption of the specimen, afterglow time for specimens never longer than 30 sec after end of flame application.
V-1: Afterflame time never longer than 30 sec after end of flame application, total of afterflame times for 10 flame applications not more than 250 sec, afterglow time for specimens never longer than 60 sec after end of flame application, remaining criteria as for V-0.
V-2 Cotton indicator ignited by flaming drops, remaining criteria as for V-1
Not classifiable (ncl): Does not conform to fire classification V-2.

The flowability of the molding compounds was determined by establishing the melt volume flow rate (MVR) at 275° C./2.16 kg. A sharp rise in the MVR value indicates polymer degradation. Fillers also have an influence on the MVR.

Tensile strength (N/mm$^2$), elongation at break, and tear strength were measured according to DIN EN ISO 527 (%); impact resistance [kJ/m$^2$], and notched impact strength [kJ/m$^2$] were measured according to DIN EN ISO 179.

The change in color after water storage was determined by storing 1 and 3 mm thick plates semi-immersed in water for seven days. The color (Lab values) was then measured in accordance with DIN 6174 using a CM 3600d spectrophotometer with white and black standards and measuring apertures, and the results were evaluated using Spectra-Magic NX software (from Minolta Europe GmbH, Germany).

For comparability, all tests in the respective series, unless stated otherwise, were performed under identical conditions (temperature programs, screw geometry, injection molding parameters, etc.).

All amounts are reported as % by weight and are based on the polymer molding compound including the flame retardant combination and additives.

Table 1 shows polyamide molding compounds that contain component A) and component B) as a flame retardant mixture. These show clearly measurable corrosion. All amounts are reported as % by weight and are based on the polymer molding compound including the flame retardant combination and additives.

TABLE 1

PA 66 GF30 V-0 with phosphinates. C1 and C2 are comparative examples without addition of PET; I1 and I2 are inventive examples

|  | Example | | | |
| --- | --- | --- | --- | --- |
|  | C1 | I1 | C2 | I2 |
| Nylon 66 | 47.6 | 37.6 | 47.6 | 37.6 |
| Glass fibers | 30 | 30 | 30 | 30 |

TABLE 1-continued

PA 66 GF30 V-0 with phosphinates. C1 and C2 are comparative examples without addition of PET; I1 and I2 are inventive examples

| | Example | | | |
|---|---|---|---|---|
| | C1 | I1 | C2 | I2 |
| Depal | 13.3 | 13.3 | 16.4 | 16.4 |
| MPP | 6.7 | 6.7 | | |
| Zinc borate | 1 | 1 | | |
| Phopal | | | 3.6 | 3.6 |
| Polyethylene terephthalate | | 10 | | 10 |
| Carbon black masterbatch 30% in PA 6 | 2 | 2 | 2 | 2 |
| Licowax E | 0.3 | 0.3 | 0.3 | 0.3 |
| PEP-Q | 0.1 | 0.1 | 0.1 | 0.1 |
| Color before storage in water | black | black | black | black |
| L value | 26.9 | 26.5 | 25.7 | 26.4 |
| Color after storage in water | gray | black | gray | black |
| L value | 33.3 | 27.2 | 34.2 | 27.2 |
| Delta Eab (D65) after 7 days in water | 6.3 | 0.2 | 8.5 | 0.8 |
| UL 94 0.4 mm | V-0 | V-0 | V-0 | V-0 |
| UL 94 0.8 mm | V-0 | V-0 | V-0 | V-0 |
| UL 94 1.6 mm | V-0 | V-0 | V-0 | V-0 |
| E modulus/N/mm$^2$ | 10901.55 | 11280.25 | 10858.91 | 11358.64 |
| Tensile strength/N/mm$^2$ | 143.02 | 133.72 | 144.11 | 138.33 |
| Elongation at break/% | 2.53 | 2.16 | 3.09 | 2.21 |

Comparative examples $C_1$ and $C_2$ show that flame-retardant polyamide 66 GF30 compounds undergo a change in color after storage in water for seven days at room temperature. This is observed both when using Depal together with melamine polyphosphate and when using Depal with Phopal. Examples I1 and I2 show that the addition of 10% polyethylene terephthalate almost completely eliminates the change in color after storage in water. At the same time, the UL 94 V-0 fire classification is maintained and the mechanical values are at a high level. Shaped bodies according to the invention have high surface quality, are easy to process, and are resistant to thermal aging.

Example 3 shows that addition of PET achieves good color stability, even when using a compatibilizer. This also improves the phase compatibility of PA 66 and PET, which leads to higher mechanical values.

TABLE 2

PA66/PET GF 30 V-0 with and without compatibilizer

| | Example | |
|---|---|---|
| | C3 | I3 |
| Nylon 66 | 56 | 44 |
| Depal | 12 | 12 |
| ZeMac E60-P EMA copolymer | | 2 |
| Glass fibers | 30 | 30 |
| Carbon black masterbatch (30% carbon black in PA 6) | 2 | 2 |
| Polyethylene terephthalate | | 10 |
| dEab (D65) 7 days in water | 3.39 | 0.21 |

TABLE 3

PA66/PET GF 30 V-0, I4-6: Variation of the PET content, C4 with polystyrene instead of PET

| | Example | | | |
|---|---|---|---|---|
| | C4 | I4 | I5 | I6 |
| PA 66 | 46 | 52 | 50 | 46 |
| Depal | 12 | 12 | 12 | 12 |
| Glass fibers | 30 | 30 | 30 | 30 |
| Carbon black masterbatch (30% in PA 6) | 2 | 2 | 2 | 2 |
| PET | | 4 | 6 | 10 |
| PS | 10 | | | |
| dE*ab (D65) 7 days in water | 3.65 | 0.16 | 0.16 | 0.15 |

Examples I4 and I5 show that addition of even a relatively small amount of PET results in there being no change in color after storage in water. Example 7 shows that addition of PBT and of a polyester elastomer likewise results in less change in color after storage in water. On the other hand, comparative examples $C_4$ and $C_5$ show that the addition of polystyrene or polyethylene glycol has no influence on the change in color after storage in water.

TABLE 4

Addition of polyglycol, polyester elastomer, and PBT

| | Example | | | |
|---|---|---|---|---|
| | C5 | I7 | I8 | C6 |
| PA 66 | 56 | 46 | 46 | 46 |
| Depal | 12 | 12 | 12 | 12 |
| Glass fibers | 30 | 30 | 30 | 30 |
| Carbon black masterbatch (30% in PA 6) | 2 | 2 | 2 | 2 |
| Polyglycol | | | | 10 |
| PBT | | 10 | | |
| Polyester elastomer | | | 10 | |
| dE*ab (D65) | 4.15 | 0.32 | 0.15 | 4.81 |

TABLE 5

Addition of PC, ABS, SEBS, and polycaprolactone

| | Example | | | | |
|---|---|---|---|---|---|
| | C7 | C8 | C9 | C10 | I9 |
| PA 66 | 46 | 46 | 46 | 46 | 46 |
| Depal | 12 | 12 | 12 | 12 | 12 |
| Glass fibers | 30 | 30 | 30 | 30 | 30 |
| Carbon black masterbatch (30% in PA 6) | 2 | 2 | 2 | 2 | 2 |
| ABS Novodur P2H-AT | 10 | | | | |
| PC Makrolon 3208 | | 10 | | | |
| Polycaprolactone | | | 10 | | |
| Lotader AX 8700 | | | | | 5 |
| SEBS Kraton FG 1901 GT | | | | 10 | |
| PET Polyclear 3300 | | | | | 5 |
| dE*ab (D65) | 3.25 | 1.28 | 1.6 | 1.92 | 0.18 |
| Surface quality | good | moderate | moderate | good | good |

Example I9 shows that no change in color is observed after storage in water even when PET and a compatibilizer (Lotader®) are added. With the addition of the other polymers, on the other hand, a discoloration after storage in water is observed as well as a deterioration in surface quality, recognizable by glass fibers at the surfaces ("cloudy" surfaces).

The invention claimed is:

1. A flame-retardant polyamide composition, comprising:
    as component A) 1% to 47.6% by weight of one or more colored thermoplastic polyamides;
    as component B) 2% to 25% by weight of a dialkylphosphinic salt of the formula (I)

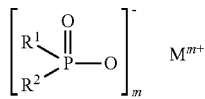

(I)

in which
    $R^1$ and $R^2$ are the same or different and are $C_1$-$C_{18}$ alkyl in linear, branched or cyclic form, $C_6$-$C_{18}$ aryl, $C_7$-$C_{18}$ arylalkyl, and/or $C_7$-$C_{18}$ alkylaryl,
    M is Mg, Ca, Al, Sb, Sn, Ge, Ti, Zn, Fe, Zr, Ce, Bi, Sr, Mn, Li, Na, K, and/or a protonated nitrogen base,
    m is 1 to 4,
    as component C) >15% to 20% by weight of at least one further polymer component selected from a polyalkylene terephthalate;
    as component D) 0 to 20% by weight of a salt of phosphorous acid of the formula (II)

$[HP(=O)O_2]^{2-}M^{m+}$ (II)

in which
    M is Mg, Ca, Al, Sb, Sn, Ge, Ti, Zn, Fe, Zr, Ce, Bi, Sr, Mn, Li, Na, and/or K;
    as component E) 0% to 20% by weight of one or more condensation products of melamine and/or reaction products of melamine with phosphoric acids and/or melamine cyanurate;
    as component F) 0% to 50% by weight of filler and/or reinforcer;
    as component G) 0-5% of a compatibilizer for the polymer components;
    as component H) 0% to 2% by weight of phosphite or phosphonite or mixtures thereof; and
    as component I) 0% to 2% by weight of an ester or salt of long-chain aliphatic carboxylic fatty acid having chain lengths of $C_{14}$ to $C_{40}$,
    wherein the sum total of the components is always 100% by weight wherein the dE*ab (D65) value after 7 days in water is between 0.15 and 0.8.

2. The flame-retardant polyamide composition as claimed in claim 1, wherein the one or more colored thermoplastic polyamides is a colored nylon-6 or colored nylon-66 or mixtures of colored nylon-6 with colored nylon-66, and/or polyphthalamide.

3. The flame-retardant polyamide composition as claimed in claim 1, wherein $R^1$, $R_2$ in formula (I) are the same or different and are methyl, ethyl, n-propyl, isopropyl, n-butyl, tert-butyl, n-pentyl, hexyl, and/or phenyl.

4. The flame-retardant polyamide composition as claimed in claim 1, wherein the polyalkylene terephthalate is a polyethylene terephthalate.

5. The flame-retardant polyamide composition as claimed in claim 1, wherein the polyalkylene terephthalate is a polyethylene terephthalate, polybutylene terephthalate, and/or a copolyester elastomer.

6. The flame-retardant polyamide composition as claimed in claim 1, wherein component D) is present and comprises reaction products of phosphorous acid with aluminum compounds.

7. The flame-retardant polyamide composition as claimed in claim 1, wherein component D) is present and comprises aluminum phosphite $[Al(H_2PO_3)_3]$, secondary aluminum phosphite $[Al_2(HPO_3)_3]$, basic aluminum phosphite $[Al(OH)(H_2PO_3)_2*2H_2O]$, aluminum phosphite tetrahydrate $[Al_2(HPO_3)_3*4H_2O]$, aluminum phosphonate, $Al_7(HPO_3)_9(OH)_6(1,6\text{-hexanediamine})_{1.5}*12H_2O$, $Al_2(HPO_3)^3*xAl_2O_3*nH_2O$ where x=1-2.27 and n=1-50, and/or $Al_4H_6P_{16}O_{18}$, or aluminum phosphites of the formulas (III), (IV), and/or (V), where
    formula (III) comprises: $Al_2(HPO_3)_3x(H_2O)_q$
        and q is 0 to 4;
    formula (IV) comprises: $Al_{2.00}M_z(HPO_3)_y(OH)_vx(H_2O)_w$
        and M represents alkali metal ions,
        z is 0.01 to 1.5,
        y is 2.63 to 3.5,
        v is 0 to 2, and
        w is 0 to 4;
    formula (V) comprises: $Al_{2.00}(HPO_3)_u(H_2PO_3)_tx(H_2O)_s$
        and u is 2 to 2.99,
        t is 2 to 0.01, and
        s is 0 to 4,
    or the aluminum phosphite comprises mixtures of aluminum phosphite of the formula (III) with sparingly soluble aluminum salts and nitrogen-free extraneous ions, mixtures of aluminum phosphite of the formula (IV) with aluminum salts, mixtures of aluminum phosphites of the formulas (III) to (V) with aluminum phosphite $[Al(H_2PO_3)_3]$, with secondary aluminum phosphite $[Al_2(HPO_3)_3]$, with basic aluminum phosphite $[Al(OH)(H_2PO_3)_2*2aq]$, with aluminum phosphite tetrahydrate $[Al_2(HPO_3)_3*4aq]$, with aluminum phosphonate, with $Al_7(HPO_3)_9(OH)_6(1,6\text{-hexanediamine})_{1.5}*12H_2O$, with $Al_2(HPO_3)_3*xAl_2O_3*nH_2O$ where x=1-2.27 and n=1-50, and/or with $Al_4H_6P_{16}O_{18}$.

8. The flame-retardant polyamide composition as claimed in claim 1, wherein component E) is present and comprises condensation products of melamine and/or reaction products of melamine with polyphosphoric acid and/or reaction products of condensation products of melamine with polyphosphoric acid or mixtures thereof; melem, melam, melon, dimelamine pyrophosphate, melamine polyphosphate, melem polyphosphate, melam polyphosphate, melon polyphosphate, and/or mixed polysalts thereof; nitrogen-containing phosphates of the formulas $(NH_4)_y H_{3-y} PO_4$ or $(NH_4 PO_3)_z$, where y is 1 to 3 and z is 1 to 10 000.

9. The flame-retardant polyamide composition as claimed in claim 1, wherein component F) is present and comprises glass fibers, glass beads, and/or mineral fillers.

10. The flame-retardant polyamide composition as claimed in claim 1, wherein component G) is present and is phthalic anhydride, pyromellitic anhydride, trimellitic anhydride, polyolefins grafted with maleic anhydride; epoxy compounds, epoxy-functional acrylates, bisoxazolines, carbodiimides, diisocyanates, and/or diurethanes.

11. The flame-retardant polyamide composition as claimed in claim 1, wherein component H is present and is phosphonites having a general structure:

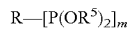

$$R-[P(OR^5)_2]_m \quad (VI),$$

where
and
R is a mono- or polyvalent aliphatic, aromatic or heteroaromatic organic radical,
$R^5$ is a compound of the structure (VII):

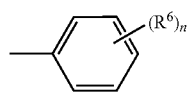

(VII)

or the two $R^5$ radicals form a bridging group of the structure (VIII):

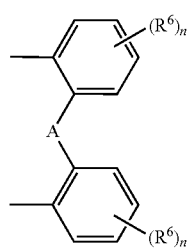

(VIII)

where
A is a direct bond, O, S, $C_{1-18}$ alkylene (linear or branched), $C_{1-18}$ alkylidene (linear or branched), in which
$R^6$ is independently $C_{1-12}$ alkyl (linear or branched), $C_{1-12}$ alkoxy, and/or $C_{5-12}$ cycloalkyl,
N is 0 to 5, and
M is 1 to 4.

12. The flame-retardant polyamide composition as claimed in claim 1, wherein component I) is present and comprises alkali metal, alkaline earth metal, aluminum, and/or zinc salts of long-chain fatty acids having 14 to 40 carbon atoms and/or reaction products of long-chain fatty acids having 14 to 40 carbon atoms with polyhydric alcohols.

13. The flame-retardant polyamide composition as claimed in claim 1, wherein the composition comprises:
30% to 47.6% by weight of component A),
5% to 20% by weight of component B),
>15% to 20% by weight of component C),
0% to 20% by weight of component D),
0% to 20% by weight of component E),
10% to 40% by weight of component F),
0% to 5% by weight of component G),
0% to 2% by weight of component H), and
0.1% to 2% by weight of component I).

14. The flame-retardant polyamide composition as claimed in claim 1, wherein the composition comprises:
30% to 47.6% by weight of component A),
5% to 20% by weight of component B),
>15% to 20% by weight of component C),
0% to 20% by weight of component D),
0% to 20% by weight of component E),
15% to 35% by weight of component F),
0.3% to 5% by weight of component G),
0% to 2% by weight of component H), and
0.1% to 2% by weight of component I).

15. The flame-retardant polyamide composition as claimed in claim 1, wherein the composition comprises:
30% to 47.6% by weight of component A),
5% to 20% by weight of component B),
>15% to 20% by weight of component C),
3% to 10% by weight of component D),
0% to 20% by weight of component E),
15% to 35% by weight of component F),
0.3% to 5% by weight of component G),
0% to 2% by weight of component H), and
0.1% to 2% by weight of component I).

16. The flame-retardant polyamide composition as claimed in claim 1, wherein the composition comprises:
30% to 47.6% by weight of component A),
5% to 20% by weight of component B),
>15% to 20% by weight of component C),
0% to 10% by weight of component D),
3% to 10% by weight of component E),
15% to 35% by weight of component F),
0.3% to 5% by weight of component G),
0% to 2% by weight of component H), and
0.1% to 2% by weight of component I).

17. The flame-retardant polyamide composition as claimed in claim 1, wherein the composition comprises:
30% to 47.6% by weight of component A),
5% to 20% by weight of component B),
>15% to 20% by weight of component C),
0.1% to 10% by weight of component D),
3% to 10% by weight of component E),
15% to 35% by weight of component F),
0.3% to 5% by weight of component G),
0.1% to 2% by weight of component H), and
0.1% to 2% by weight of component I).

18. The flame-retardant polyamide composition as claimed in claim 1, wherein the composition further comprises telomers and that the telomers comprise ethylbutylphosphinic acid, dibutylphosphinic acid, ethylhexylphosphinic acid, butylhexylphosphinic acid, ethyloctylphosphinic acid, sec-butylethylphosphinic acid, (1-ethylbutyl)butylphosphinic acid, ethyl(1-methylpentyl)phosphinic acid, di-sec-butylphosphinic acid (di- 1-methylpropylphosphinic acid), propyl(hexyl)phosphinic acid, dihexylphosphinic acid, hexyl(nonyl)phosphinic acid, dinonylphosphinic acid, and/or salts thereof with the metals Mg, Ca, Al, Sb, Sn, Ge, Ti, Zn, Fe, Zr, Ce, Bi, Sr, Mn, Li, Na, K, and the telomers are different from component A).

19. The flame-retardant polyamide composition as claimed in claim 1, wherein the composition additionally comprises zinc oxide, zinc borate, and/or zinc stannate.

20. The flame-retardant polyamide composition as claimed in 1, wherein the composition comprises further additives, wherein the further additives are selected from the group consisting of antioxidants, UV stabilizers, gamma-ray stabilizers, hydrolysis stabilizers, co-stabilizers for antioxidants, antistats, emulsifiers, nucleating agents, plasticizers, processing auxiliaries, impact modifiers, dyes, pigments, and/or further flame retardants other than components B), D), E), F), H), and I).

21. The flame-retardant polyamide composition as claimed in claim 1, wherein the composition comprises, as a further component, iron in the form of an iron-containing substance, wherein the amount of iron-containing substance is 0.0001% to 10% by weight of the total mixture.

22. The flame-retardant polyamide composition as claimed in claim 1 in the form of an electrical product.

23. The flame-retardant polyamide composition of claim 1 in the form of shaped bodies, films, filaments, foils, and/or fibers.

24. The flame-retardant polyamide composition as claimed in claim 1, wherein the one or more colored thermoplastic polyamides comprise carbon black.

25. The flame-retardant polyamide composition as claimed in claim 1, wherein the composition comprises 37.6% to 47.6% by weight of component A).

26. A three-dimensional article comprising the flame-retardant polyamide composition as claimed in claim 1, wherein said article is a shaped body, injection molding, extrusion compound, and/or extrudate.

* * * * *